(12) United States Patent
Liu et al.

(10) Patent No.: US 7,874,786 B2
(45) Date of Patent: Jan. 25, 2011

(54) DISC TURNING CHUTE AND METHOD THEREOF

(75) Inventors: Ming-Hsun Liu, 3F/No.8, Lane 143, Xinming Rd., Neihu District, Taipei 11471 (TW); Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 158 days.

(21) Appl. No.: 11/687,804

(22) Filed: Mar. 19, 2007

(65) Prior Publication Data
US 2008/0232229 A1  Sep. 25, 2008

(51) Int. Cl.
*B65G 47/22* (2006.01)
*B65G 47/24* (2006.01)

(52) U.S. Cl. ............... 414/816; 414/788.5; 414/791.6; 414/758; 414/770; 193/46

(58) Field of Classification Search ............. 193/44–48; 198/402, 403; 221/156, 171–173; 414/754, 414/758–759, 768, 773, 780–781, 936
See application file for complete search history.

(56) References Cited

U.S. PATENT DOCUMENTS

| | | | | | |
|---|---|---|---|---|---|
| 898,113 | A | * | 9/1908 | Jones | 193/46 |
| 2,400,419 | A | * | 5/1946 | Hohl et al. | 193/46 |
| 2,440,959 | A | * | 5/1948 | Krueger | 193/45 |
| 3,526,310 | A | * | 9/1970 | Tessmer, Jr. | 198/380 |
| 3,567,008 | A | * | 3/1971 | Fischer | 198/402 |
| 3,587,804 | A | * | 6/1971 | Marenco | 193/47 |
| 3,866,741 | A | * | 2/1975 | Carbon et al. | 414/789 |
| 4,214,656 | A | * | 7/1980 | McDonald et al. | 198/380 |
| 4,469,229 | A | * | 9/1984 | Cronan | 209/544 |
| 5,458,227 | A | * | 10/1995 | Wheeler et al. | 198/403 |
| 6,760,052 | B2 | * | 7/2004 | Cummins et al. | 347/171 |
| 2008/0282273 | A1 | * | 11/2008 | Liu et al. | 720/615 |

OTHER PUBLICATIONS

Center of Gravity—cg, Glenn Research Center, authored by Tom Benson of NASA, available at http://www.grc.nasa.gov/WWW/K-12/airplane/cg.html, on Feb. 10, 2006.*

* cited by examiner

*Primary Examiner*—Gregory W Adams
(74) *Attorney, Agent, or Firm*—Rosenberg, Klein & Lee (57) ABSTRACT

A disc turning device and method thereof utilizes a device whose supporting portion is located at one side of the gravity center of the disc body to make the disc body, under the gravity action, use the supporting portion as a pivot to carry out turning operation, thus achieving the objectives of automatic turning operation by gravity using and energy saving.

2 Claims, 14 Drawing Sheets

DISC TURNING CHUTE AND METHOD THEREOF

BACKGROUND OF THE INVENTION

1. Field of the Invention

The present invention relates to a disc turning device and method thereof, and more particularly to a disc turning device and method thereof which utilize the gravity to offer automatic turning function.

2. Description of the Prior Art

Conventionally, when one side of a data storage disc is burned or printed, the disc must be turned manually to process the other side. It is an obvious problem that needs to be solved urgently in an automatic operation flow. On the present market, all the machine tools, of whatever type, are driven by electricity, hydraulic pressure and air pressure, their structures are not only relatively large but also energy exhausting. If a disc turning unit without occupying large space and energy consumption can be developed, it will be helpful to industrial popularization and energy saving.

The present invention has arisen to mitigate and/or obviate the afore-described disadvantages.

SUMMARY OF THE INVENTION

The primary objective of the present invention is to provide a disc turning device, which utilizes its supporting portion as a pivot for a disc body under the action of gravity to turn 180 degrees.

The second objective of the present invention is to provide a disc turning method, which positions the pivot beside the gravity center of the disc body, so as to make the disc body under the action of gravity turn to the other side of the disc body opposite the pivot and finish the turning operation when turning 180 degrees.

To achieve the abovementioned objectives, the disc turning device in accordance with the present invention comprises two symmetrical rail grooves opposite each other. Each rail groove successively includes, in the direction of gravity, an entry section, a turning section and an exit section. They are characterized in that: the turning section includes a protruding element and a concave element and the protruding element includes a first supporting portion located at one side of the entry section. The protruding element and the concave element include a second supporting portion and an arc stopping edge respectively.

The entry section of each rail groove of the turning device includes a gap for inserting the disc body.

The first supporting portion of the protruding element of the turning section of each rail groove of the disc turning device is located at one side of the center of the gap of the entry section and located in the opposite direction of the protruding portion of the protruding element.

The protruding element of the turning section of each rail groove of the disc turning device protrudes towards one side of each rail groove and its protruding portion cooperates with the concave portion of the concave element.

The first supporting portion of protruding element of the turning section of each rail groove of the disc turning device is located at the top of the protruding portion of the protruding element.

A disc turning device comprises a load element. The load element successively includes, in the direction gravity, a supporting portion and a stopping portion. The supporting portion is located at the top of the load element and protrudes from one side of the load element.

The disc turning device further comprises a limiting element opposite the load element and the supporting portion of the load element protrudes towards the limiting element.

The load element of the disc turning device is formed with a through hole at the gravity direction of the stopping portion.

A disc turning method comprises the steps of:

establishing a pivot and a guide surface spaced therefrom and placing a disc body in an initial position positioning a disc body to a tipping position wherein the disc body is supported off-center on the pivot and has a longitudinal axis parallel with a horizontal surface about which said dice is turned;

tipping the dice body under the downward action of gravity from the tipping position along a turning path providing two oppositely opposed channels, each channel comprising a downwardly sloped portion and upwardly sloped portion connected at an arcuate portion, the edge portion maintaining slidable engagement of the guide surface over at least an initial part of the turning path;

turning said disc by sliding disc through said oppositely opposed channels;

wherein said disc slide down downwardly sloped portions, horizontally turns about said arcuate potions and continues sliding down upwardly sloped portion to accomplish said 180 degree orientation relative to the initial position;

the initial and tipping positions coincide.

The useful effect of the present invention is that: the disc turning device and method thereof utilizes a device whose supporting portion located by the side of the gravity center of the disc body to make the disc body, under the gravity action, use the supporting portion as a pivot to carry out turning operation, thus achieving the objectives of automatic turning operation by gravity using and energy saving.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
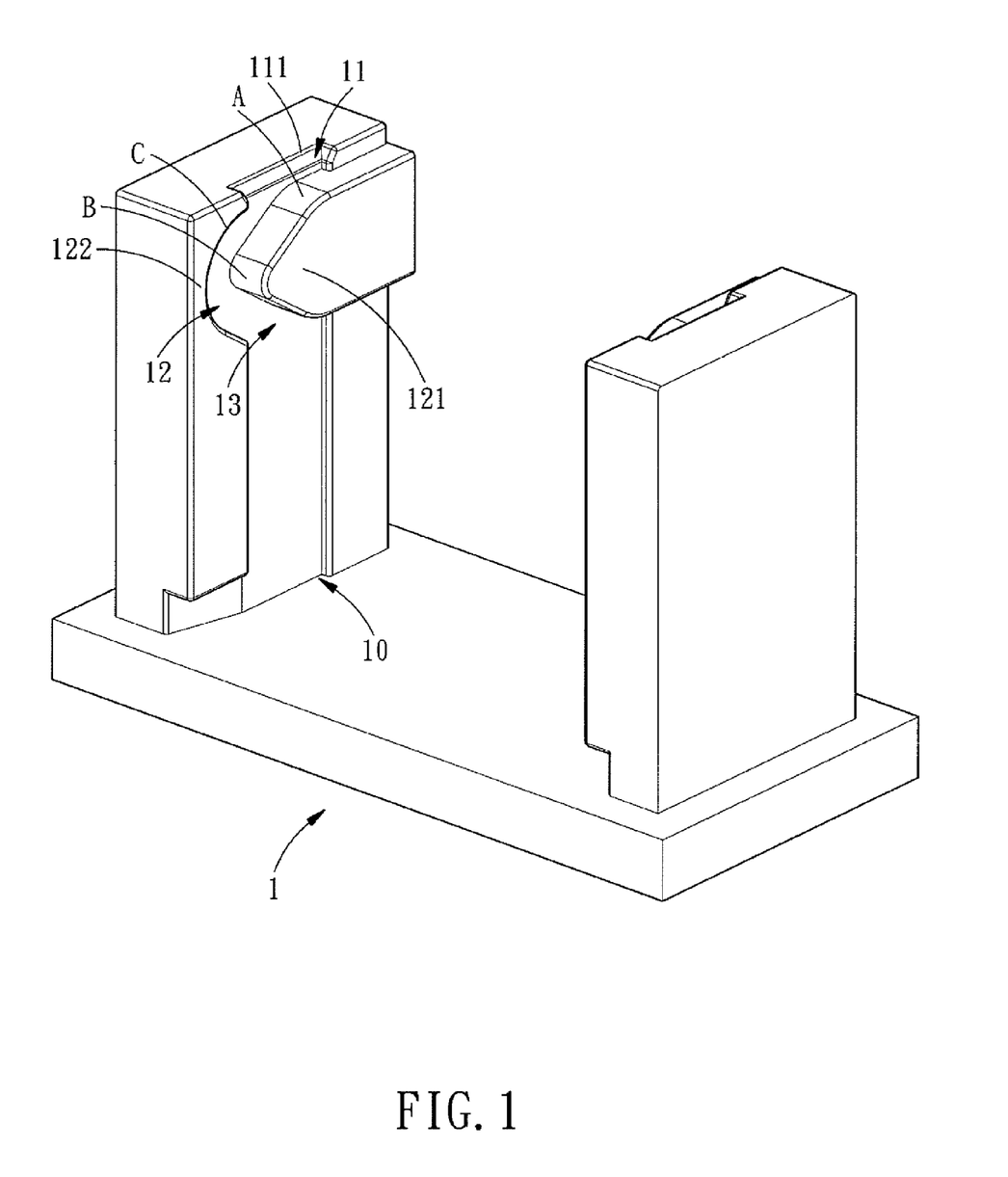
FIG. 1 is a perspective view of a disc turning device, which comprises two rail grooves of a preferred embodiment in accordance with the present invention.

Referring to FIG. 1, a disc turning device 1 in accordance with a preferred embodiment of the present invention comprises two symmetrical rail grooves 10 opposite each other. Each rail groove successively includes, in the direction of gravity, an entry section 11, a turning section 12 and an exit section 13. The entry section 11 includes a gap 111, and the turning section 12 includes a protruding element 121 and a concave element 122. The protruding element 121 protrudes towards one side of the rail groove 10 and its protruding portion cooperates with the concave portion of the concave element 122. The protruding element 121 includes a first supporting portion A located at one side of the center of the gap 111 of the entry section 11 and located in the opposite direction of the protruding portion of the protruding element 121. The protruding element 121 further includes a second supporting portion B located at the top of the protruding portion of the protruding element 121. The concave element 122 includes an arc stopping edge C located opposite the second supporting portion B of the protruding element 121.

Figure 2A:
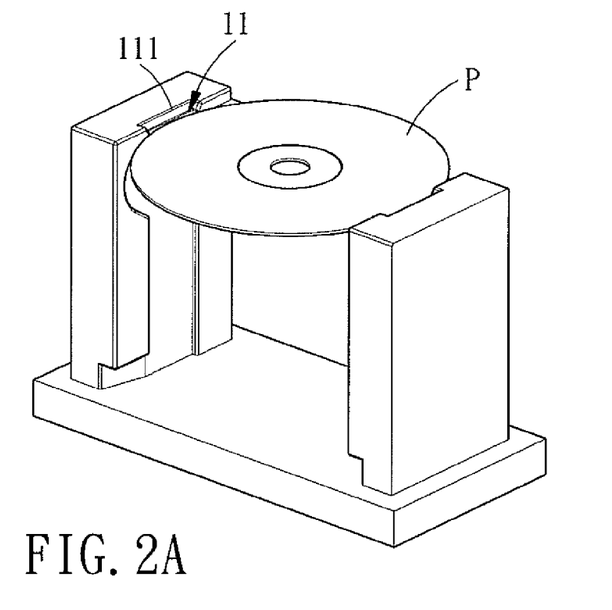
FIG. 2A is a perspective view of showing that a disc body is inserted in the disc turning device in FIG. 1 in accordance with the prevent invention.
Figure 2B:
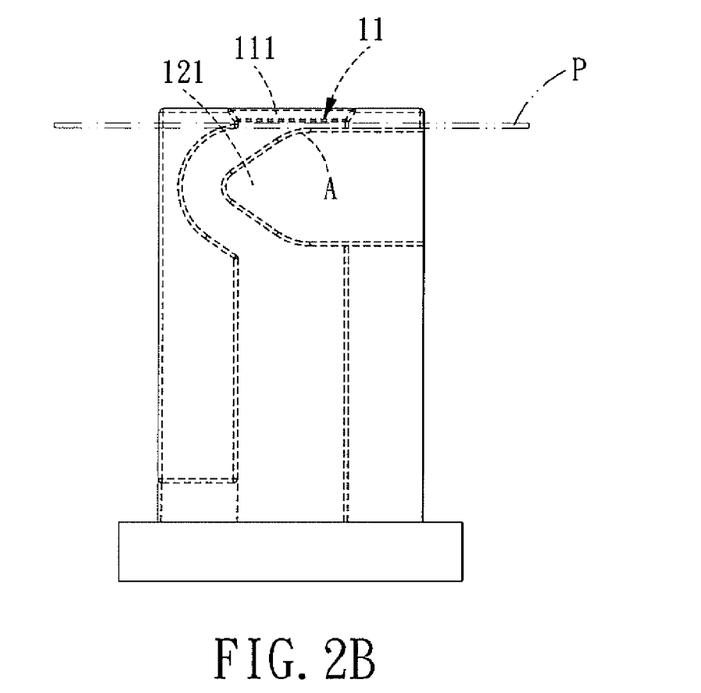
FIG. 2B is a side view of FIG. 2.
Figure 3A:
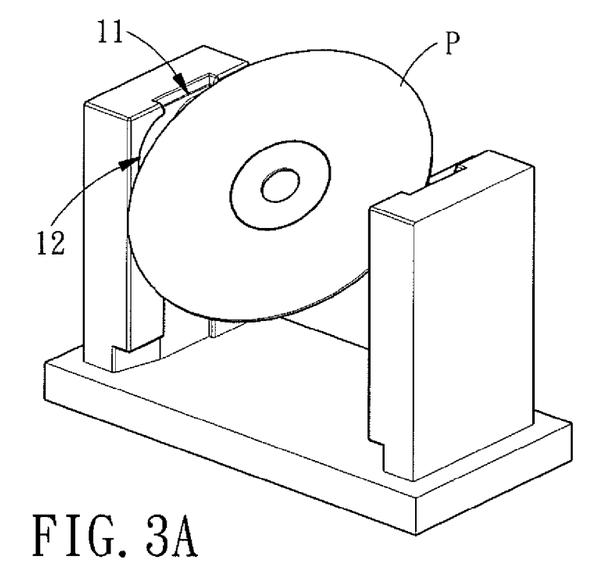
FIG. 3A shows that the disc body in FIG. 2 uses the first supporting portion as a pivot to rotate.
Figure 3B:
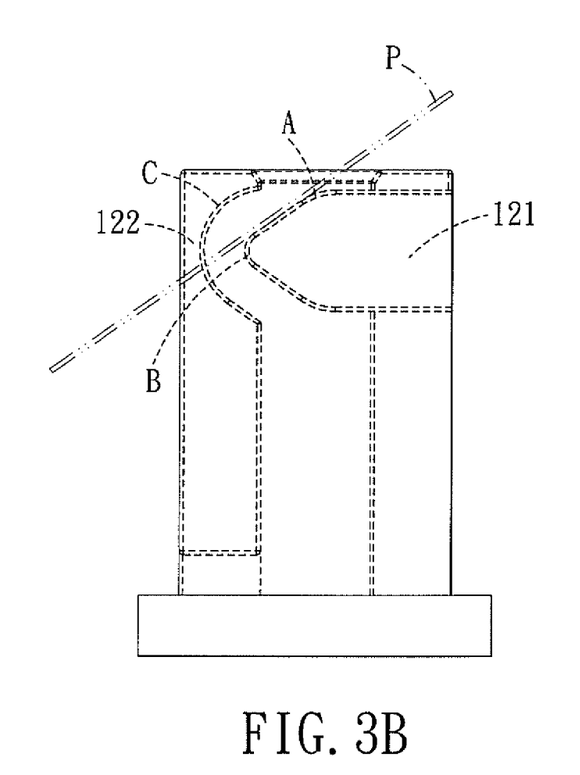
FIG. 3B is a side view of FIG. 3A.
Figure 4A:
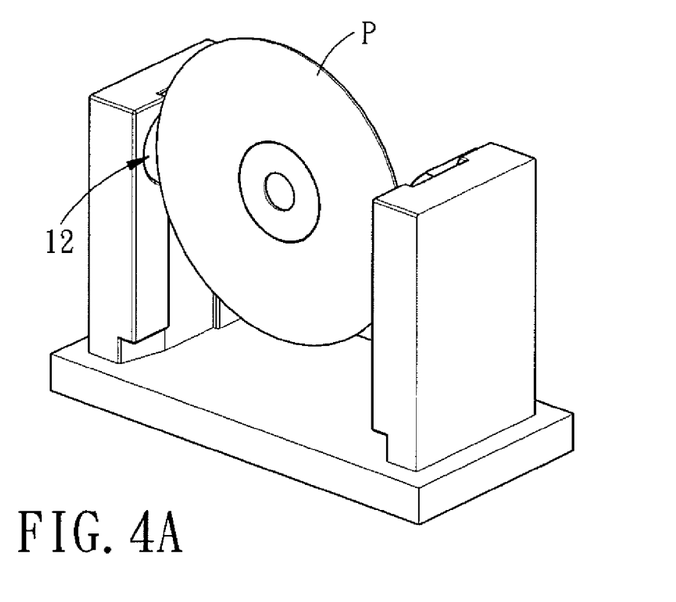
FIG. 4A shows that the disc body in FIG. 3A which has disengaged from the first supporting portion uses the second supporting portion as a pivot to rotate.
Figure 4B:
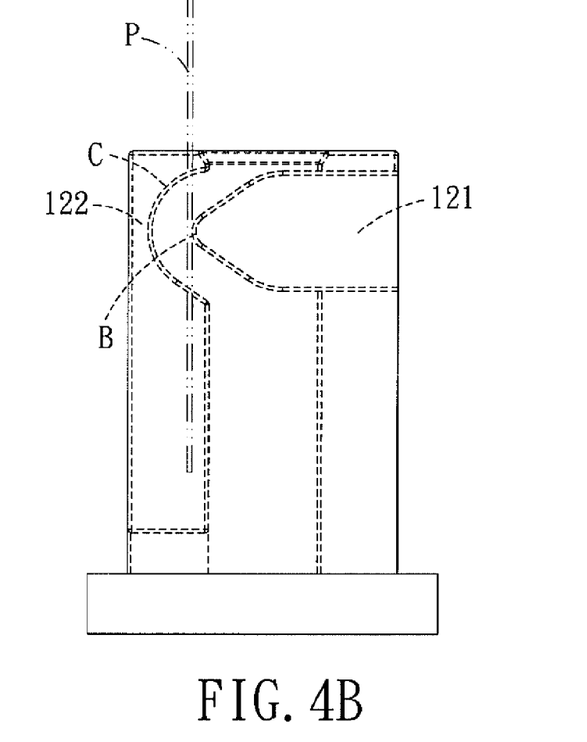
FIG. 4B is a side view of FIG. 4A.
Figure 5A:
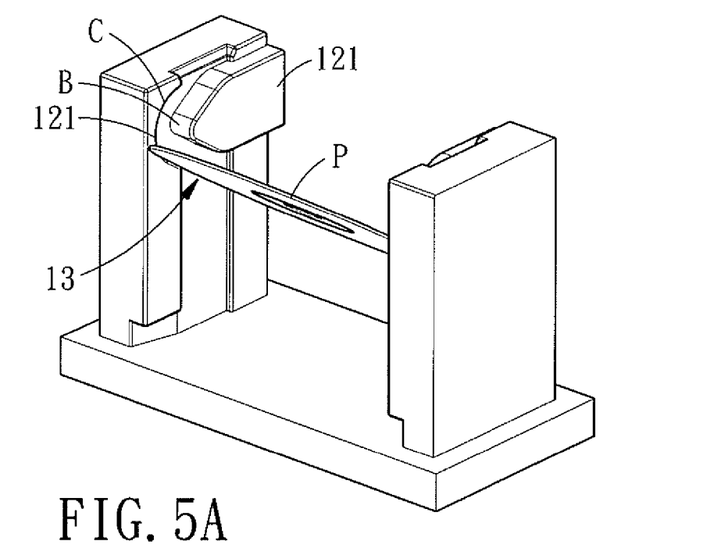
FIG. 5A shows that the disc body in FIG. 4A which has disengaged from the second supporting portion is sliding along an arc stopping edge.
Figure 5B:
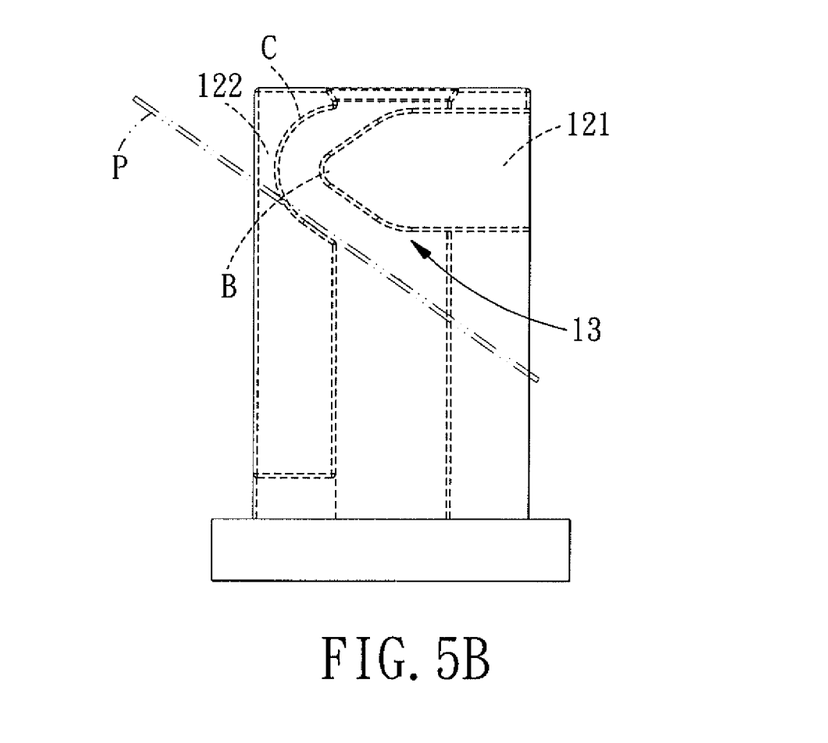
FIG. 5B is a side view of FIG. 5A.
Figure 6A:
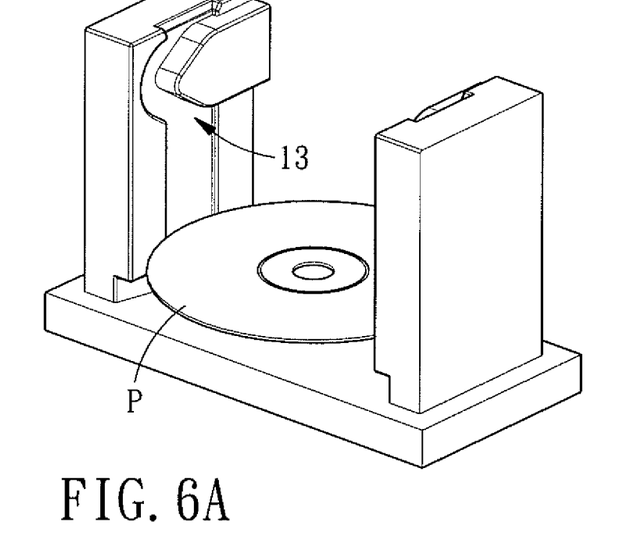
FIG. 6A shows that the disc body in FIG. 4A has slid down from the arc stopping edge and finished the turning operation.
Figure 6B:
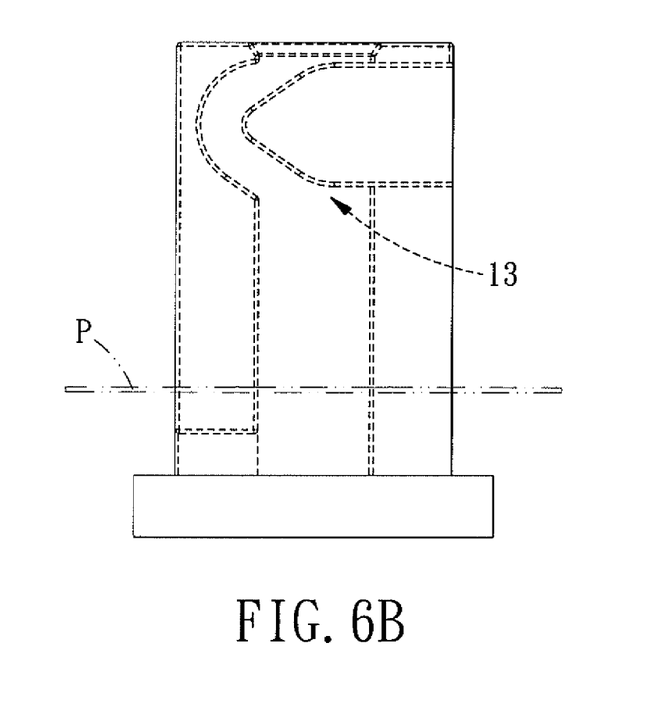
FIG. 6B is a side view of FIG. 6A.

The turning operation of this preferred embodiment of the present invention is shown in FIGS. 2A-6B. Referring to FIG. 2A and FIG. 2B first, a disc body P is inserted in between the two rails 10 from the gaps 111 of the entry sections 11. The disc body P in this preferred embodiment is a general optical disc for example and is placed on the first supporting portions A of the turning sections 12. Since located at one side of the center of the gap 111 of the entry section 11 and located in the opposite direction of the protruding portion of the protruding element 121, and the gravity center of a general optical disc is at its centre, the disc body P is supported beside the gravity centre thereof by the first supporting portion A. Thereby, the disc body P as shown in FIG. 3A and FIG. 3B, under the action of gravity, utilizes the supporting portions A as pivots to rotate towards the protruding direction of the protruding element 121. After abutting against the arc stopping edge C of the protruding element 121, the disc body P as shown in FIG. 4A and FIG. 4B, will utilize the second supporting portion B as pivots to rotate around the arc stopping edges C of the concave elements 122. Then, as shown in FIG. 5A and FIG. 5B the disc body P will disengage from the second supporting portions B by the actions of gravity and the rotation-caused centrifugal force and will slide along the arc stopping edge C in the direction of gravity. At last, the disc body, as shown in FIG. 6A and FIG. 6B, will slide out from the exit sections 13. Through the abovementioned steps, the disc body P has been turned 180 degrees and finished the disc turning operation.

Figure 7:
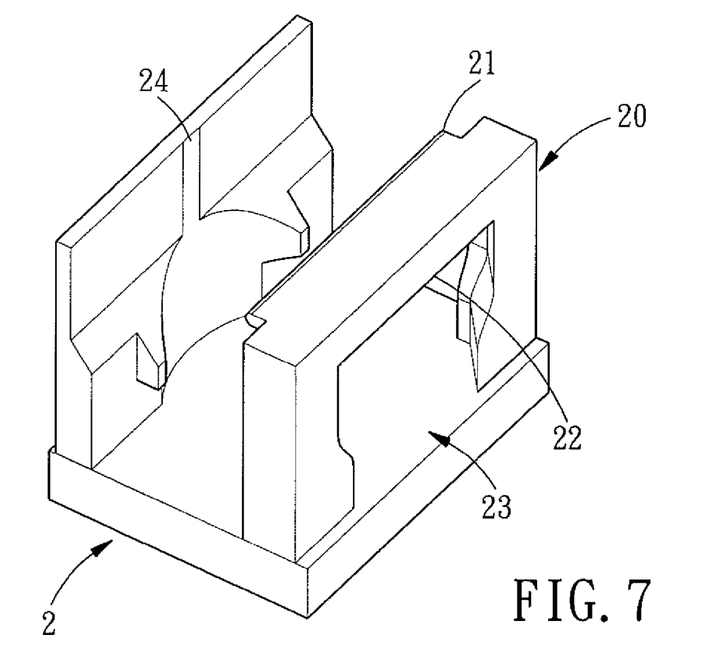
FIG. 7 is a perspective view of a disc turning device, which comprises a limiting element and a load element in accordance with the present invention.
Figure 8:
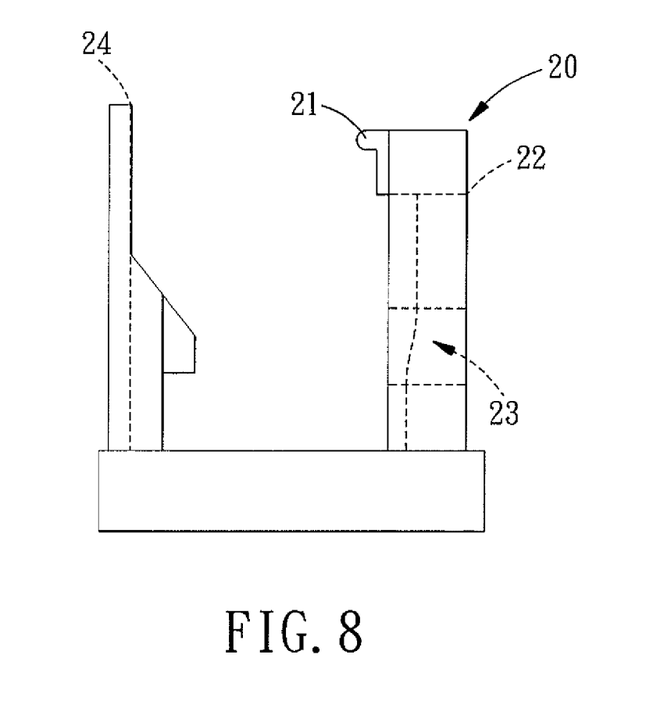
FIG. 8 is a side view of the disc turning device, which comprises the limiting element and the load element in accordance with the present invention.

Additionally, referring to FIGS. 7-8, a disc turning device 2 in accordance with another embodiment of present invention comprises a load element 20 and a limiting element 24 opposite the load element 20. The load element 20 successively includes, in the direction of gravity, a supporting portion 21, a stopping portion 22 and a through hole 23. The supporting portion 21 is located at the top of the load element 20 and protrudes from one side of the load element 20 to the limiting element 24.

Figure 9A:
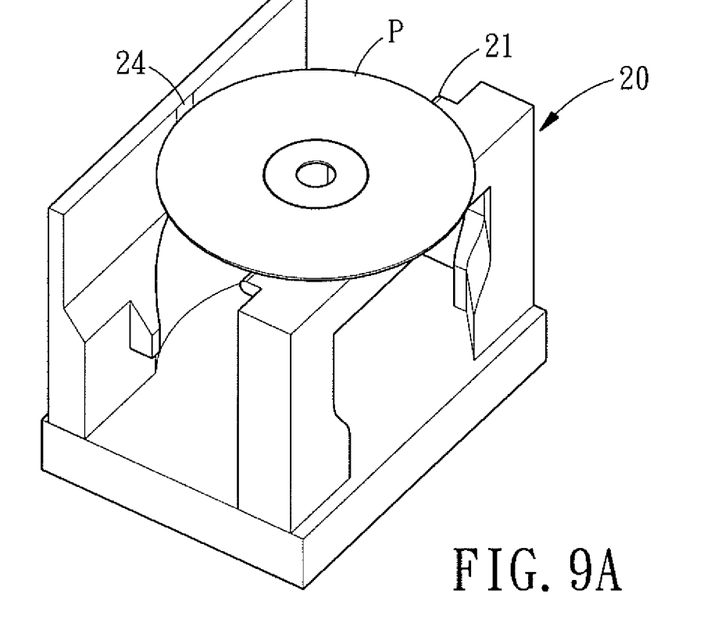
FIG. 9A is a perspective view of the load element whose top is placed with a disc body.
Figure 9B:
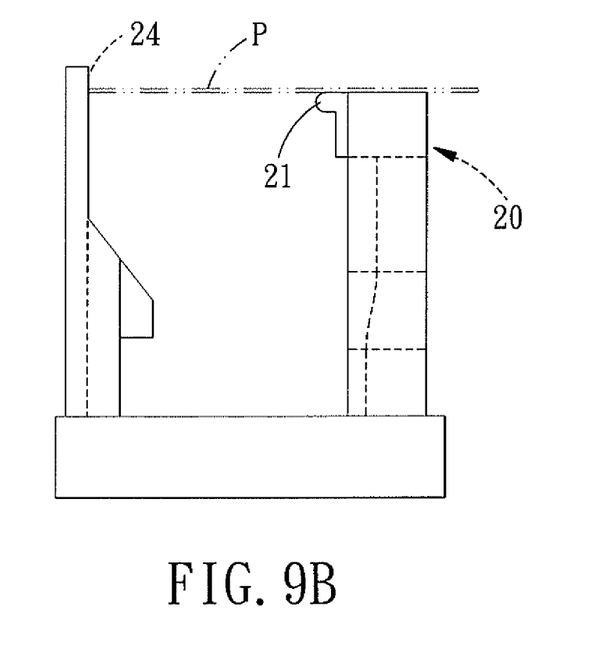
FIG. 9B is a side view of FIG. 9A.
Figure 10A:
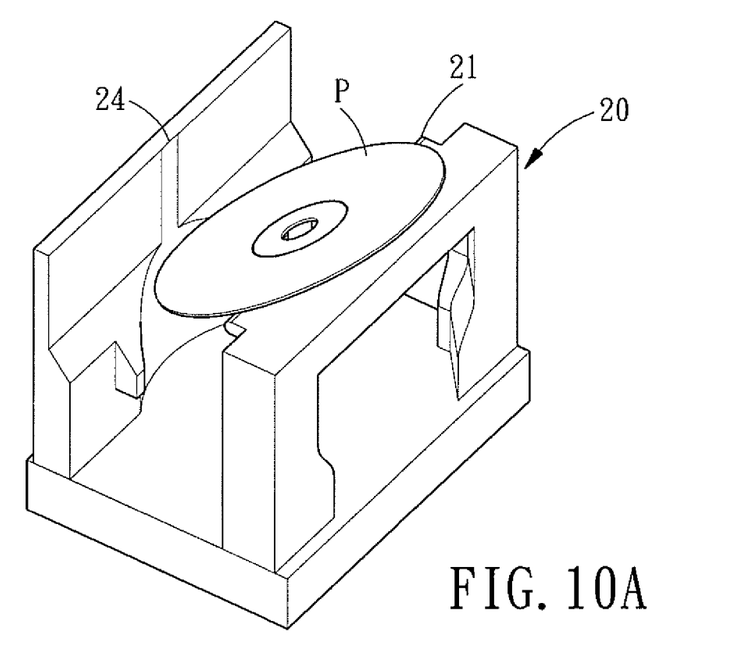
FIG. 10A shows that the disc body in FIG. 9A uses the supporting portion as a pivot to rotate.
Figure 10B:
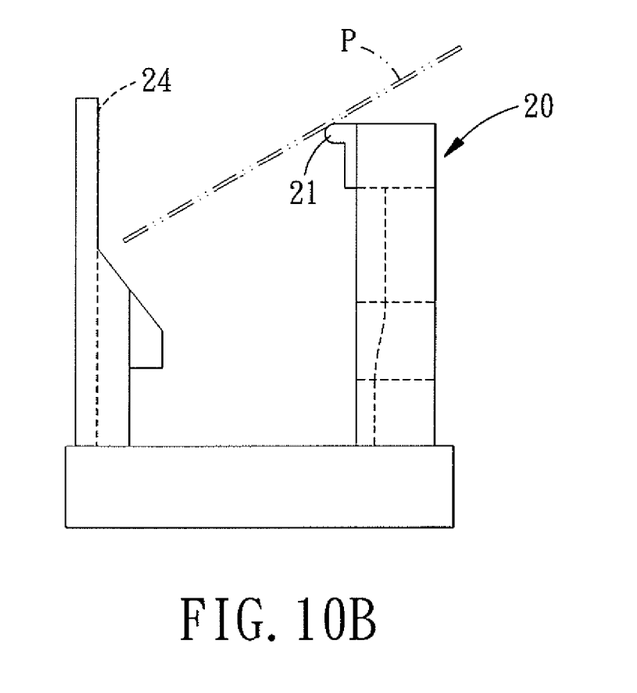
FIG. 10B is a side view of FIG. 10A.
Figure 11A:
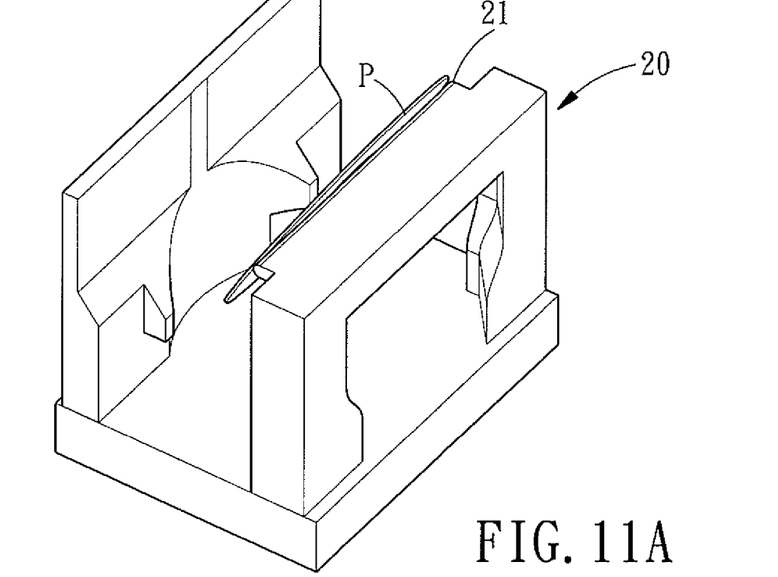
FIG. 11A shows that the disc body in FIG. 10A uses the supporting portion as a pivot to continue the rotation.
Figure 11B:
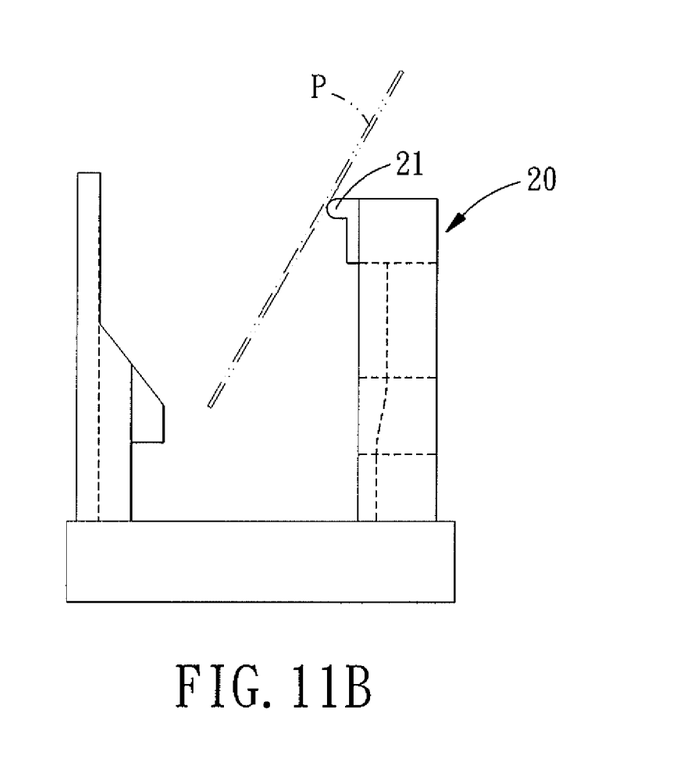
FIG. 11B is a side view of FIG. 11A.
Figure 12A:
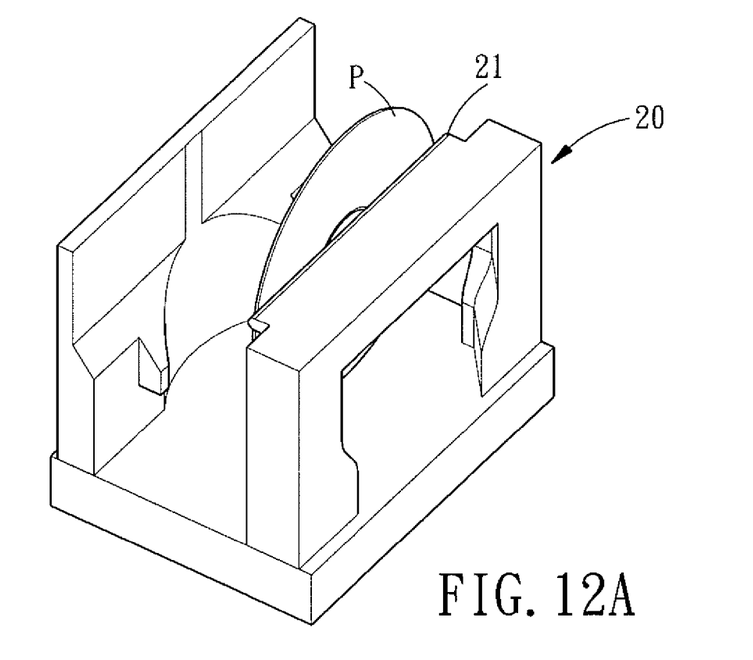
FIG. 12A shows that the disc body in FIG. 11A uses the supporting portion as a pivot to continue the rotation.
Figure 12B:
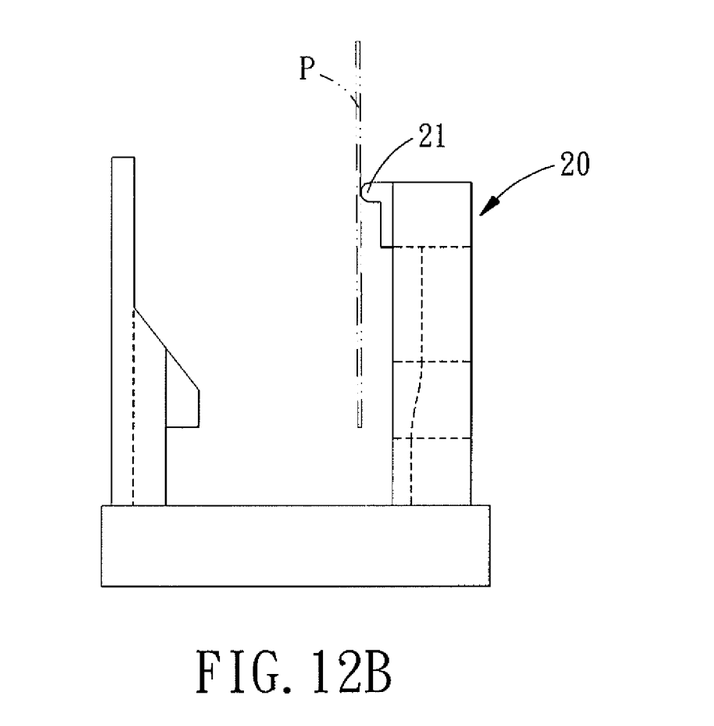
FIG. 12B is a side view of FIG. 12A.
Figure 13A:
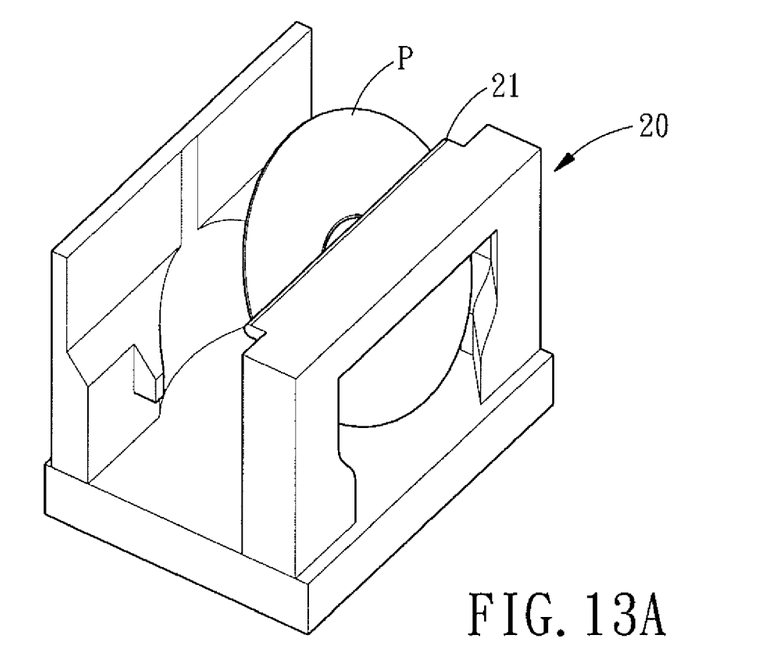
FIG. 13A shows that the disc body in FIG. 12A uses the supporting portion as a pivot to continue the rotation.
Figure 13B:
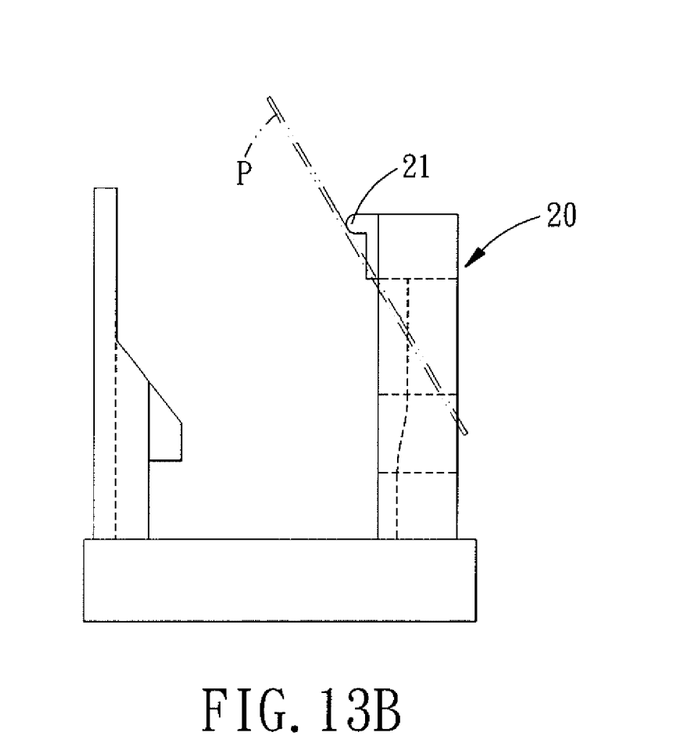
FIG. 13B is a side view of FIG. 13A.
Figure 14A:
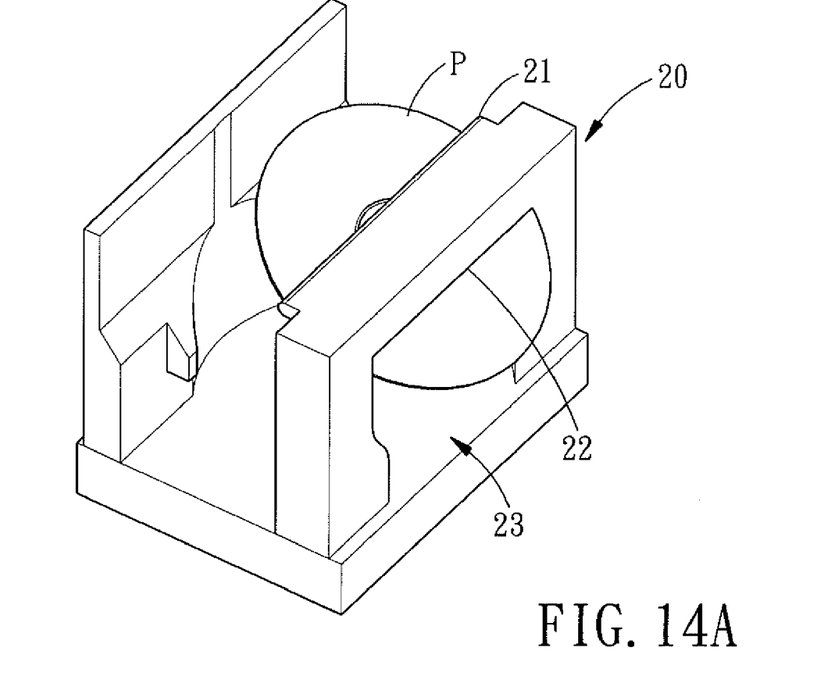
FIG. 14A shows that the disc body in FIG. 13A is stopped by the stopping portion.
Figure 14B:
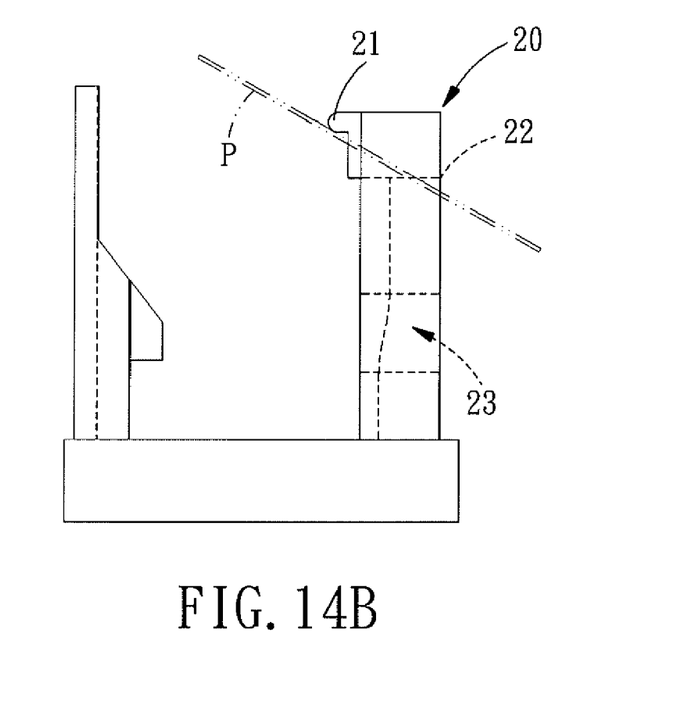
FIG. 14B is a side view of FIG. 14A.
Figure 15A:
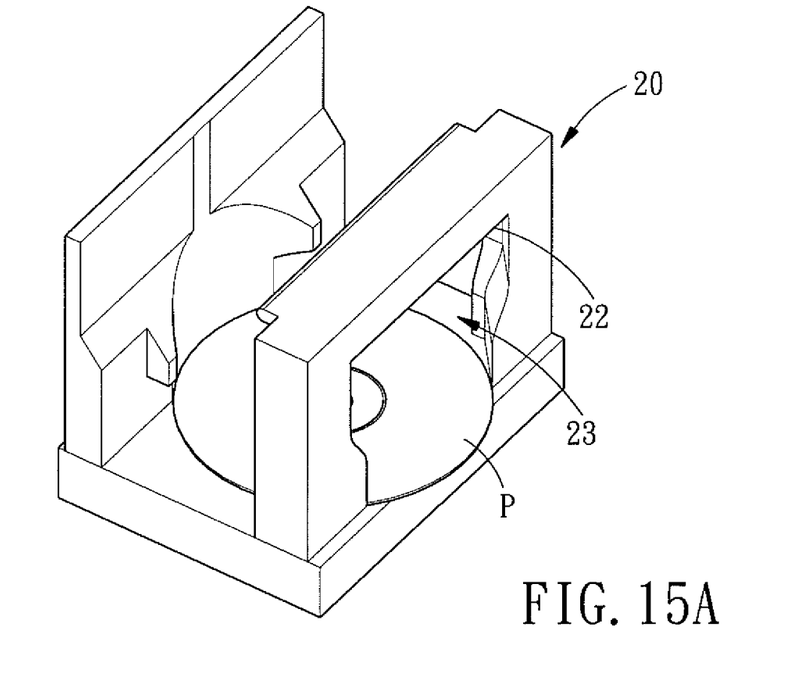
FIG. 15A shows that the disc body in FIG. 14A which has been stopped drops down to finish the turning operation.
Figure 15B:
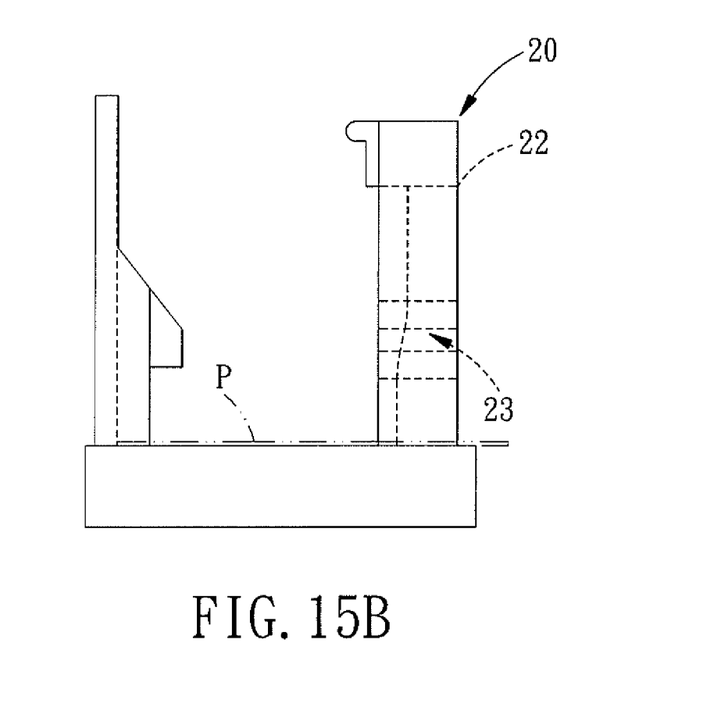
FIG. 15B is a side view of FIG. 15A.

The turning operation of this preferred embodiment of the present invention is shown in FIGS. 9A-15B. Referring to FIG. 9A and FIG. 9B, a disc body P is positioned at the top of the load element 20. The disc body P in this preferred embodiment is a general optical disc for example and the gravity center of the disc body P is positioned between the load element 20 and the limiting element 20, so the disc body P, under the action of the gravity, as shown in FIGS. 10A-13B, utilizes the supporting portion 21 of the load element 20 as a pivot to rotate. Afterwards, as shown in FIG. 14A and FIG. 14B, after turning and passing through the through hole 23 and being stopped by the stopping portion 22 of the load element 20, the disc body P will disengage from the supporting portion 21 and drop down in the direction of gravity. Through the abovementioned steps, the disc body P has been turned 180 degrees and finished the disc turning operation, as shown in FIG. 15A and FIG. 15B.

Both the above-mentioned two disc-turning devices are based on the lever principle, the two turning sections 12 of the rails 10 are two opposed channels, each channel comprises a downwardly sloped portion and upwardly sloped portion connected at an arcuate portion which is defined between the concave element 122 and the second supporting portion B, the downwardly sloped portion and the upwardly sloped portion are the portions of the turning section 12 located below and above the concave element 122, respectively.

The method for turning disc comprises the steps of:

establishing a pivot and a guide surface spaced therefrom and placing a disc body in an initial position positioning a disc body to a tipping position wherein the disc body is supported off-center on the pivot and has a longitudinal axis parallel with a horizontal surface about which said disc is turned;

tipping the disc body under the downward action of gravity from the tipping position along a turning path providing two oppositely opposed channels, each channel comprising a downwardly sloped portion and upwardly sloped portion connected at an arcuate portion, the edge portion maintaining slidable engagement of the guide surface over at least an initial part of the turning path;

turning said disc by sliding disc through said oppositely opposed Channels;

wherein said disc slide down downwardly sloped portions, horizontally turns about said arcuate potions and continues sliding down upwardly sloped portion to accomplish said 180 degree orientation relative to the initial position;

the initial and tipping positions coincide.

Since the disc body makes use of the gravity action to turn, it can turn itself without energy consuming and has the effect of energy saving. Moreover, its efficacy can be relatively clearly presented, if applied to the automatic disc burning system.

To summarize, the disc turning device and method thereof in accordance with the present invention utilizes a device whose supporting portion located by the side of the gravity centre of the disc body to make the disc body, under the gravity action, use the supporting portion as a pivot to carry out turning operation, thus achieving the objectives of automatic turning operation by gravity using and energy saving.

While we have shown and described various embodiments in accordance with the present invention, it is clear to those skilled in the art that further embodiments may be made without departing from the scope of the present invention.

What is claimed is:

1. A disc turning method comprising the steps of:
establishing a pivot and a guide surface spaced therefrom; establishing an initial position above the pivot in a gravity direction which is vertical to the pivot;
placing a disc body in the initial position and releasing the disc body to make it free fall from the initial position to the pivot wherein the disc body is supported off-center on the pivot and an edge portion of the disc body slidably engages the guide surface;
tipping the disc body under the downward action of gravity from the tipping position along a turning path, the edge portion maintaining slidable engagement of the guide surface over at least an initial part of the turning path; and
finishing a turn operation, whereby the disc body displaces along the turning path to be reoriented by substantially 180 degrees relative to the initial position;
and reorientating by 180 degrees as the disc body is traversing in the gravity direction.

2. A disc turning method comprising the steps of:
establishing a pivot and a guide surface spaced therefrom and placing a disc body in an initial position
positioning a disc body to a tipping position wherein the disc body is supported off-center on the pivot and has a longitudinal axis parallel with a horizontal surface about which said disc is turned;
tipping the disc body under the downward action of gravity from the tipping position along a turning path providing two oppositely opposed channels, each channel comprising a downwardly sloped portion and upwardly sloped portion connected at an arcuate portion, the edge portion maintaining slidable engagement of the guide surface over at least an initial part of the turning path;
turning said disc by sliding disc through said oppositely opposed channels;
wherein said disc slide down downwardly sloped portions, horizontally turns about said arcuate potions and continues sliding down upwardly sloped portion to accomplish said 180 degree orientation relative to the initial position;
the initial and tipping positions coincide.

* * * * *